Dec. 16, 1930.  C. D. YOUNG  1,785,168
LOADING AND UNLOADING APPARATUS
Filed Sept. 17, 1928  2 Sheets-Sheet 1
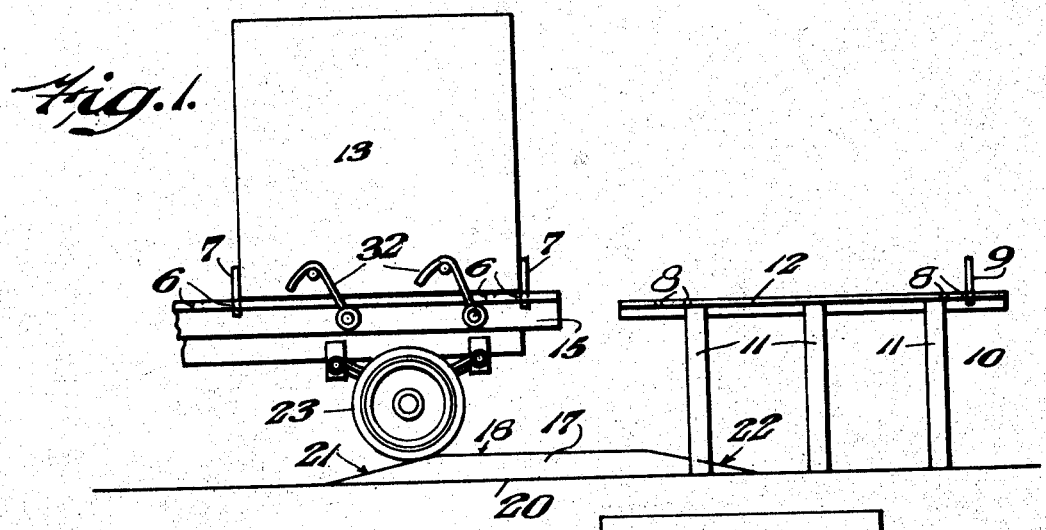
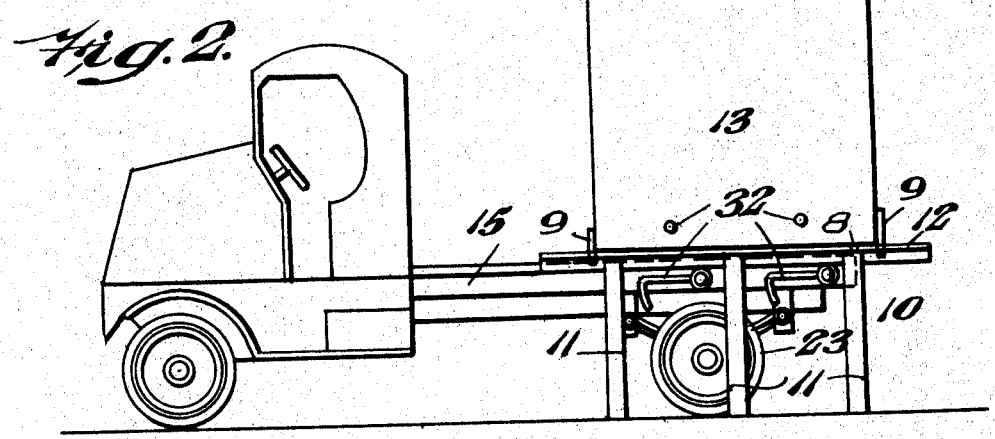
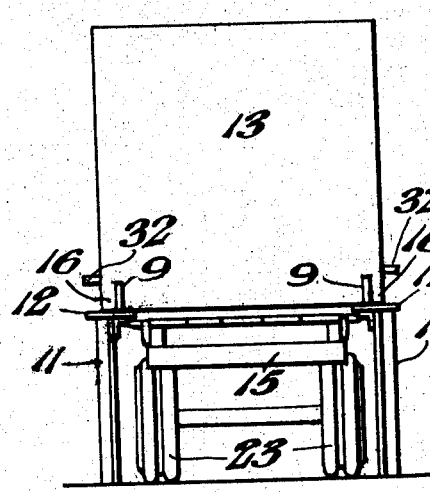
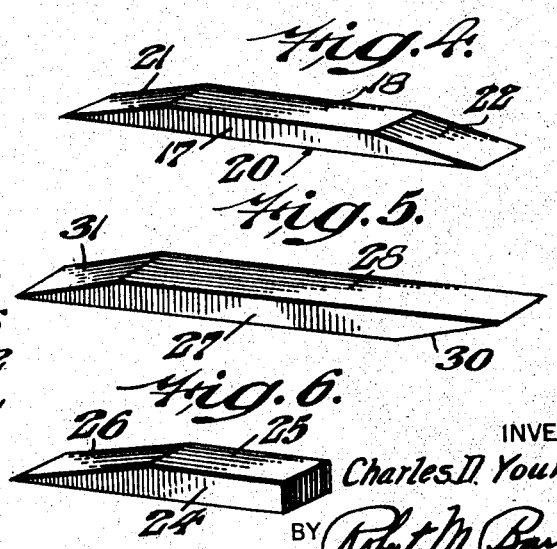
INVENTOR:
Charles D. Young.
BY Robert M. Barr
ATTORNEY.

Dec. 16, 1930.      C. D. YOUNG      1,785,168
LOADING AND UNLOADING APPARATUS
Filed Sept. 17, 1928      2 Sheets-Sheet 2

INVENTOR:
Charles D. Young,
BY Robert M. Barr
ATTORNEY.

Patented Dec. 16, 1930

1,785,168

UNITED STATES PATENT OFFICE

CHARLES D. YOUNG, OF WAYNE, PENNSYLVANIA

LOADING AND UNLOADING APPARATUS

Application filed September 17, 1928. Serial No. 306,548.

The present invention relates to the transportation of merchandise and more particularly to the loading and unloading of merchandise containers which are transported from one terminal to another by automobile trucks or other vehicles.

Some of the objects of the present invention are to provide an efficient and economical system and apparatus for handling containers in which bulk shipments of merchandise are to be transported; to provide an apparatus for automatically transferring containers from a vehicle to a platform and vice versa wherein alterations or changes in the roadway for the vehicle are unnecessary to carry out the desired end; to provide an apparatus for transferring containers from one support to another without employing cranes or other hoisting mechanism; to provide a container handling apparatus wherein the movable supporting platform for a container can be elevated and lowered with respect to the supporting surface of a fixed support automatically for the purpose of transferring a container from one support to the other; to provide a container handling apparatus wherein manual labor is reduced to a minimum; to provide a container transferring apparatus wherein the movement of a vehicle such as a motor truck, automatically accomplishes the transfer of the container from one support to another; and to provide other improvements as will hereinafter appear.

Figure 7:
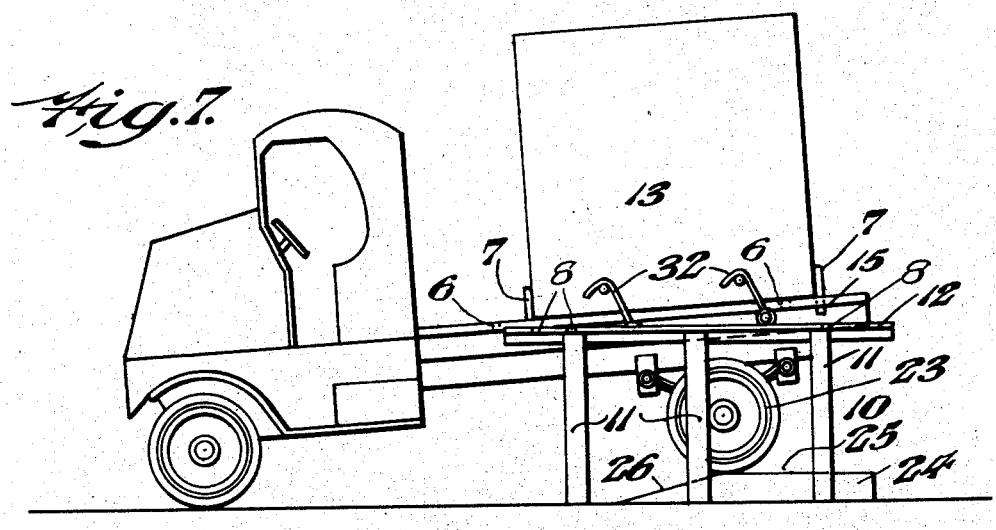
Figure 8:
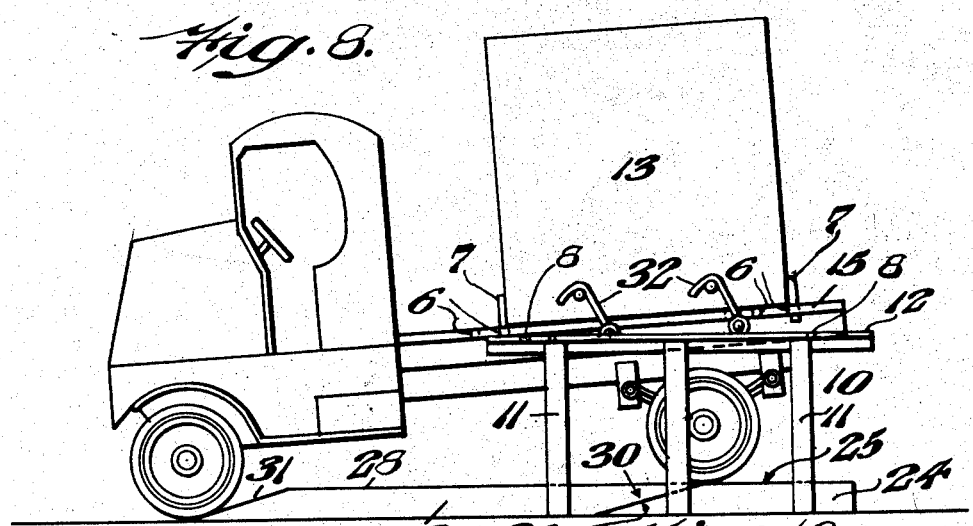
Figure 9:
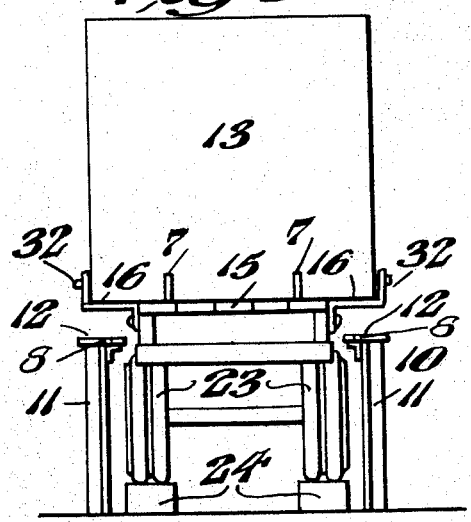
Figure 10:
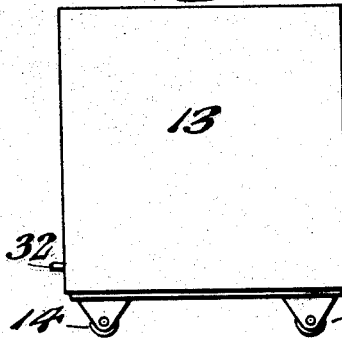

In the accompanying drawings, Fig. 1 represents a side elevation of a container handling apparatus embodying one form of the present invention and illustrating a truck bringing a container to the unloading station; Fig. 2 represents a side elevation of the same showing a container transferred to the fixed support; Fig. 3 represents a rear elevation of Fig. 2; Figs. 4, 5 and 6 represent respectively perspectives of different control blocks employed in the system; Fig. 7 represents a side elevation of the apparatus with the parts in position just after a container has been transferred to the motor truck; Fig. 8 represents a similar elevation showing the arrangement of the parts so that the truck can drive away with the loaded container; Fig. 9 represents a rear elevation of Fig. 8; and Fig. 10 represents a side elevation of another form of container.

Referring to the drawings, one form of the present invention includes a container receiving and supporting structure 10 of a fixed nature, consisting in the present instance of two parallelly arranged series of posts 11, both of the same height, and each series carrying a rail 12 for supporting one side of a container 13. Stop pins 9 are provided for insertion in holes 8 in the rails 12 to position a container in any predetermined position. The containers 13 are usually of the type without wheels, but the system is not limited to such particular container but can with equal facility handle a container equipped with wheels 14 as shown in Fig. 10. The rails 12 are so spaced as to permit a truck body 15 to enter between them but close enough together to be located beneath the respective side portions 16 of the bottom of the container. Also the tops of the two rails in the present instance lie in a horizontal plane just above the plane of the floor or platform of the truck body 15. It will thus be evident that if the truck has its container supporting platform raised above the rails 12 as the truck backs into the space between the two rails and is thereafter lowered to its normal level, the container will be automatically removed from the truck body and rest upon the rails 12. Stop pins 7 are provided to seat in holes 6 of the truck platform in position to push the container when the truck moves rearwardly and pull the container when the truck moves forwardly.

In order to carry out this successive raising and lowering of the truck platform as the truck rides into the space between the rails 12, a pair of control blocks 17 are provided of like size and shape and each consisting of an elongated member having a top face 18 parallel to the bottom face 20 which rests upon the ground or roadway and two end top faces 21 and 22 which are inclined upwardly and converge toward the face 18. Thus when these two blocks 17 are placed upon the roadway respectively in the path of the truck wheel 23, the latter under movement of the truck will ride upwardly upon the incline 21 and traverse the level faces 18, at which level the thickness of the block 17 is such as to raise the side portions 16 of the bottom of the container above the respective rails 12. The length of the block 17 is such that when the wheels 23 reach the downwardly inclined faces 22 the container will be over the two guard rails and hence continued rearward movement of the truck causes the container to be automatically transferred to the fixed support 10.

When the container has thus been received upon the rails 12, the two blocks 17 are removed and consequently the outgoing travel of the truck is at the normal or lower level than the rails 12 and consequently the container is left supported upon the rails 12.

For the purpose of automatically loading the container 13 upon the vehicle body 15, two loading control blocks 24 are provided of like size and shape and each consisting of a level top surface 25 which leads to a downwardly inclined face 26 at one end. The height of these blocks 24 is such that when the wheels 23 of the truck are raised to the level 25, the receiving platform of the truck body 15 will be elevated above the level of the rails 12. Hence in loading a container upon the truck, the two blocks 24 are placed in the path of travel of the wheels 23 and beneath the supporting structure 10, the inclined portions 26 being disposed toward the approaching truck. When the empty truck is backed into place between the rails 12, the wheels 23 ride upwardly along the two inclines 26 until they reach the top faces 25 of the two blocks 24 and hence cause the truck body 15 to rise above the rails 12 and lift the container 13 therefrom.

In order that the truck may carry the container 13 with it as it leaves the space between the rails 12, two levelling blocks 27 are employed both of the same size and shape and each consisting of a top or track face 27 and two end faces 30 and 31 which are substantially parallel to each other and downwardly inclined. This incline corresponds to the incline 26 of the blocks 24 and since the blocks 27 are of the same thickness as the blocks 24 the positioning of the two latter in alignment with the two blocks 24 provides two trackways as a continuation of the trackways 25. Thus as seen in Fig. 8 the two blocks 27 are located in operative position and movement of the truck away from the fixed support causes it to travel so that its supporting platform is above the level of the rails 12 and the container can thus clear the top of the rail and be carried away by the truck. The container is preferably locked to the truck body by latch means 32 so that the container cannot be jostled about as the truck rides over uneven highways.

It will now be apparent that a complete automatically operable equipment has been devised for efficiently and economically loading and unloading containers upon vehicles, such as motor trucks and the like, and thereby increasing the handling facilities of freight while materially reducing the time of such handling. Furthermore all transferring movements of the containers are accomplished without the assistance of overhead hoisting apparatus such as cranes or chain hoists travelling on overhead trackways, and only the services of the truck driver are required. Thus for unloading a container the truck driver places the two elevating blocks 17 in alignment with the respective wheels 18 and so positioned with respect to the fixed support that the two inclines 22 come into action to lower the truck to the ground level where the container has been brought to a position where its bottom is above the rails 12. The driver then backs the truck toward the space between the rails 12 so that the rear wheels 18 ride upwardly along the two inclines 21 to thereby elevate the truck platform to the level of the two surfaces 18 in which position the projecting sides of the container are above the plane of the rails. Continued backing of the truck with the pushing action of the pins 7 brings the container over the rails and substantially simultaneously the wheels 23 ride down the inclines 22 so that the container is pushed rearwardly by the pins 7 and automatically lifted from the truck body and transferred to the fixed support. The container can now be left on the fixed support in the position determined by the stops 9 by moving the two blocks 17 out of the return path of the wheels 23 and driving the truck out at the normal ground level. When a container is to be transferred from the fixed support to the platform of the vehicle, the driver places the two elevating blocks 24 in position beneath the fixed support and respectively in alignment with the paths of the truck wheels 23. The empty truck is now backed into position between the rails and when it reaches the two inclines 26 its supporting platform is carried upwardly to a plane above the rails and in this movement lifts the container from the rails as will be understood. The rear pull pins 7 are now inserted in the truck platform back of the container and the two filler blocks 27 are placed respectively in front of the elevating blocks 24, the one inclined face of one block contacting with the opposed inclined face of the other and consequently two extensions of the blocks 24 are provided which form a trackway elevated above the ground for a distance sufficient for the truck to move outwardly and carry the container beyond the rails before it rides down the inclines 31 to the ground level.

Having thus described my invention, I claim:

1. A container handling apparatus comprising in combination a movable platform for supporting a container, a fixed support for said container, and means including a plurality of blocks arranged to be placed on the surface of a roadway for varying the level of said roadway adjacent said fixed support whereby movement of said platform along said roadway a distance substantially equal to the length of said container causes said container to be automatically transferred from one supporting medium to the other.

2. A container handling apparatus comprising in combination a movable platform for supporting a container, a fixed support for said container, and a pair of blocks arranged to be placed on said roadway for coacting with said movable platform to first raise said platform to a level above said fixed support and then lower said platform to a level below said fixed support, whereby movement of said platform along said roadway a distance substantially equal to the length of said container causes said container to be automatically transferred from said platform to said fixed support.

3. A container handling apparatus comprising in combination a movable platform for supporting a container, a fixed support for said container, and a pair of blocks arranged to be placed on said roadway beneath said fixed support for elevating said platform above the level of said fixed support when said platform moves in one direction, whereby movement of said platform into engagement with said blocks causes a container on said fixed support to be automatically transferred to said platform, and a pair of levelling blocks arranged respectively to be aligned with said elevating blocks for providing elevated trackways leading from said fixed support whereby said transferred container is removed with said platform.

4. A container handling apparatus comprising in combination a motor vehicle for supporting a container, a pair of rails spaced to receive said vehicle between them and forming a fixed support for said container, and a pair of elevating and lowering control blocks arranged to be placed on said roadway in alignment respectively with the wheels of said vehicle, each of said blocks comprising two upwardly inclined converging faces forming a continuation of an intermediate supporting surface.

5. A container handling apparatus comprising in combination a motor vehicle for supporting a container, a pair of rails spaced to receive said vehicle between them and forming a fixed support for said container, and a pair of elevating control blocks arranged to be placed on said roadway in alignment respectively with the wheels of said vehicle and below said rails, each of said blocks comprising an upwardly inclined face leading to a wheel supporting face at a level to bring the platform of said vehicle above said rails.

6. A container handling apparatus comprising in combination a motor vehicle for supporting a container, a pair of rails spaced to receive said vehicle between them and forming a fixed support for said container, a pair of elevating control blocks arranged to be placed on said roadway in alignment respectively with the wheels of said vehicle and below said rails, each of said blocks comprising an upwardly inclined face leading to a wheel supporting face at a level to bring the platform of said vehicle above said rails, and means for causing said vehicle to leave said control blocks in an elevated position whereby said container is carried away by said vehicle.

Signed at Philadelphia, county of Philadelphia, State of Pennsylvania, this 18th day of August, 1928.

CHARLES D. YOUNG.